United States Patent [19]

Wilbs

[11] Patent Number: 5,465,935

[45] Date of Patent: Nov. 14, 1995

[54] HOLDING MEANS FOR IMPLEMENT SHAFTS

[75] Inventor: Alfred Wilbs, Wutöschingen, Germany

[73] Assignee: Bajo Trading Anstalt, Balzers, Liechtenstein

[21] Appl. No.: 237,696

[22] Filed: May 4, 1994

[30] Foreign Application Priority Data

May 5, 1993 [DE] Germany .......................... 43 14 770.4

[51] Int. Cl.[6] ..................................... A47G 1/10
[52] U.S. Cl. ......................... 248/316.3; 211/66; 248/113
[58] Field of Search ..................... 248/110, 113, 248/316.5, 231.5, 316.3; 211/66

[56] References Cited

U.S. PATENT DOCUMENTS

| 1,081,381 | 12/1913 | Hakes ........................ 248/113 |
| 1,306,585 | 6/1919 | Droege ....................... 248/113 |
| 1,366,324 | 1/1921 | Newquist ................... 248/113 |
| 1,736,290 | 11/1929 | Schiff ......................... 248/113 |
| 1,779,427 | 10/1930 | Gillet ......................... 248/113 |
| 1,798,028 | 3/1931 | Nachtigal ................... 248/113 |
| 2,370,876 | 3/1945 | Richardson ............. 248/113 X |
| 2,869,209 | 1/1959 | Kautzky ................. 248/113 X |
| 3,161,393 | 12/1964 | Swanson .................. 248/113 |

FOREIGN PATENT DOCUMENTS 769425  3/1957  United Kingdom ................ 248/113

Primary Examiner—J. Franklin Foss
Attorney, Agent, or Firm—Notaro & Michalos

[57] ABSTRACT

Between a fixed resting jaw (14) and a upwardly angled clamping jaw (22) of a holding means (10), a tube (20) is firmly clamped in a vertical position. Wrapped around the movable clamping jaw (22) is a rubber belt ring (38) with which the former rests against the tube with a strong adhesive effect. Even extremely smooth tubes are prevented from slipping through.

1 Claim, 4 Drawing Sheets

HOLDING MEANS FOR IMPLEMENT SHAFTS

BACKGROUND OF THE INVENTION

The invention relates to a holding means for shafts and tubes of implements, with a plate-shaped carrier to be fastened to a building wall, a resting jaw with at least one vertical resting face in working position projecting from said carrier and a spring-loaded clamping jaw capable of being swivelled about an axis at right-angles to the plane of the plate-shaped carrier, said axis featuring a clamping face facing the resting jaw, the distance of said clamping face from the swivelling axis being greater than the distance of a shaft or tube resting against the resting jaw from the swivelling axis with the consequence that, when the holding means is in its working position, the clamping face of the clamping jaw is at a height above that of the swivelling axis and the difference in height between said clamping face and the swivelling axis is smaller than the height of the resting face or, in the case of several coplanar resting faces, is smaller than the difference in height between the top-most point of the top-most resting face from the bottom-most point of the bottom resting face and with a rubber part wrapped at least around part of the clamping face as an anti-slip device.

PRIOR ART

Such a holding means is known from DE-A-34 47 534. This holding means employs a packet of clamping jaws each of which consists of a U-shaped or box-shaped wire hoop. One limb of the hoop forms the clamping face and the other, for instance, the bearing pin received in a borehole of the holder. The method of shaft clamping is based on the toggle joint principle. The closer the angle between the clamping jaw and the shaft comes to 90°, the greater the clamping force. Under the prior art, all the hoops of the hoop packet have different lengths with the consequence that a certain clamping jaw comes into effect according to the diameter of the shaft. However, in the case of very smooth shafts or tubes, the clamping force is insufficient. The rubber part is intended as an anti-slip device. According to the drawing of this document, the rubber sleeve is wrapped around the limb of the hoop with radial play such that the rubber sleeve can be freely rotated. With this holding means, very smooth tubes, particularly those of heavy implements, cannot be firmly clamped.

SUMMARY OF THE INVENTION

The object of the invention is to improve the holding means of the above-mentioned type in such a manner that the anti-slip effect is improved without increasing the clamping effect of the holding means.

This object has been fulfilled by the present invention in that the clamping jaw features a single-piece bearing shell at the end opposite the clamping face, said bearing shell having a bearing hole for a separate bearing pin, and in that the rubber part is designed as an elastically extensible rubber belt ring which is wrapped around the entire clamping jaw under pretension such that two at least approximately straight or slightly curved, stretched sections are formed between two roughly semicircular arcs at the clamping face and the bearing shell, and such that the rubber belt ring as a whole is held immovably at the clamping jaw.

According to the invention, the rubber belt ring maximizes the holding effect such that even extremely smooth tubes, e.g. chrome-plated vacuum cleaner tubes, can be held absolutely firmly. This is not possible with any of the known holding means. Whereas according to the cited prior art the rubber part is merely compressed at the clamping face, the endless rubber belt ring according to the invention ensures a local extension at the clamping face which is accompanied by an attenuation at the clamping point. Furthermore, the tubular rubber part according to the prior art can rotate on the limb of the hoop, causing a rolling effect which contradicts the intention to hold the implement shaft firmly. By contrast, the rubber belt ring according to the invention is wrapped under pretension around the entire clamping jaw and cannot move in its entirety on the clamping jaw. Nevertheless, the above-mentioned local elongations occur, these being at their greatest at the clamping point but also extending over the top adjacent part of the rubber belt ring. This local extension of the rubber belt ring after the insertion of a tube or shaft in the holding means yields the extremely high holding force.

According to one embodiment of the invention, the rubber belt ring has a smaller width than the clamping jaw and is only wrapped around the middle part of the latter, the two ends remaining exposed. This feature is beneficial particularly for the holding of tubes and shafts featuring basically round cross sections. The rubber belt ring is preferably non-slidably received in a channel running around the clamping jaw, said rubber belt ring protruding slightly over the adjacent faces of the clamping jaw at the clamping face. The channel has a positioning function for the rubber belt ring to exclude lateral displacement. With the exception of the clamping face area, the rubber belt ring can lie in the channel flush with the surface. In the clamping face area, however, the channel depth declines such that the rubber belt ring protrudes above the neighboring surfaces when compressed during operation.

The clamping face of the clamping jaw is roughly speaking semicylindrical, i.e. convex at the clamping face. In accordance with an advantageous improvement, the middle part of the clamping face has a V-shaped or concave depression in an axial section containing the swivelling axis. Without the rubber belt ring enclosing this depression, the shaft would be held at two points. The rubber belt ring becomes elastically deformed in accordance with the radius of the shaft being held such that the surface of the rubber belt ring rests against the shaft. Depending on the chosen depth of this recess in the clamping face, a cavity is created which is covered from the outside by the rubber belt ring.

Another advantageous improvement exists in that the top of the clamping jaw features a longitudinal depression between the clamping face and the bearing shell, there being a distance between the floor of the depression and the rubber belt ring. The depression is thus spanned by the rubber belt ring and since the rubber belt ring does not rest on the clamping jaw at this point, it can stretch more easily when clamping a shaft, and additional rubber can be drawn from the area of the clamping face.

One advantage of the feature of the invention is that the clamping jaw can easily be adjusted to different diameter ranges. The bearing pin has preferably a dual function. It anchors the clamping jaw at the slide and at the same time places the slide in the desired sliding position on the carrier. The advantage of another feature is that a conventional spiral spring can be fitted with ease and further increase in the holding force is achieved.

The invention is described in greater detail with reference to the drawing which presents a single embodiment.

BRIEF DESCRIPTION OF THE DRAWING

It shows.

DETAILED DESCRIPTION

Figure 1:
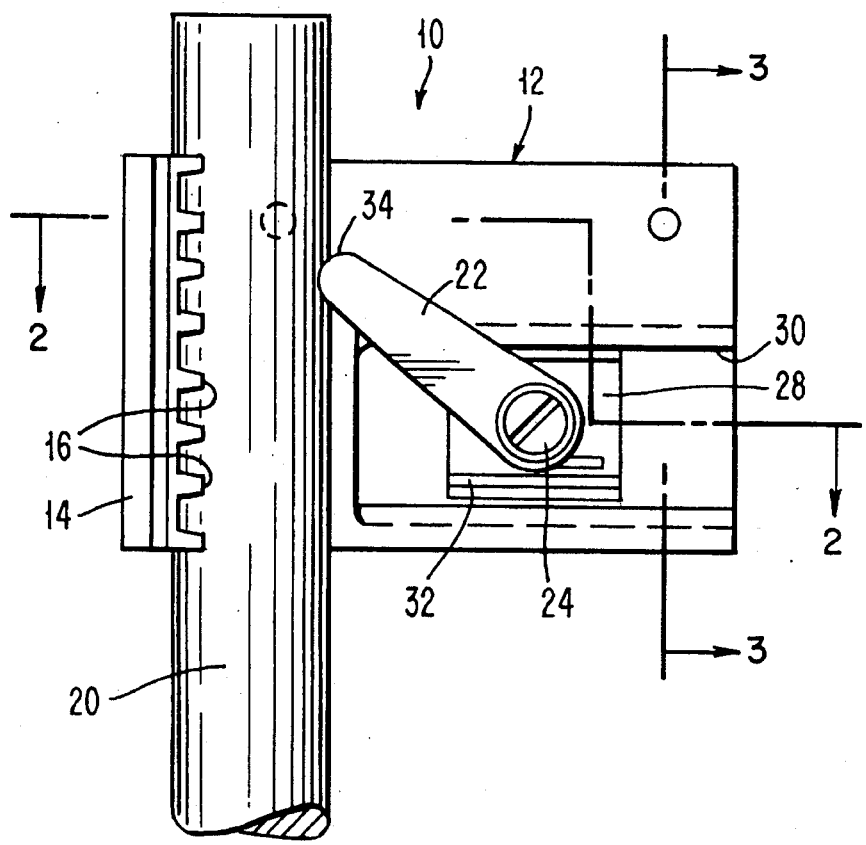
FIG. 1 a front view of the new holding means.
Figure 3:
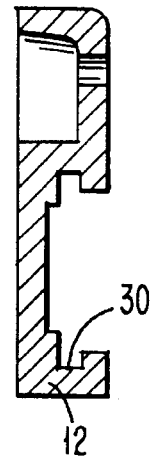
FIG. 3 a vertical sectional view along the line 3—3 of FIG. 2 with the representation of the carrier cross section, FIG. 4 a view of the holding means similar to FIG. 1 but illustrating the wide clamping range such that with the swivelling axis of the clamping jaw in the same position it is possible to clamp thick and thin shafts, FIG. 5 a horizontal sectional view along the line 5—5 showing the clamping of a thick shaft, FIG. 6 a sectional view along the line 6—6 showing the clamping of a thin shaft, FIG. 7 a cross section of the clamping jaw along the line 7—7 of FIG. 9, FIG. 8 a sectional view of part of the clamping jaw on a larger scale, FIG. 9 a top view of the clamping jaw, FIG. 10 a sectional view similar to FIG. 1 but with an additional rubber belt at the resting jaw, along the line 10—10 of FIG. 11, and FIG. 11 a cross-sectional view of the holding means in accordance with FIG. 10.
Figure 2:
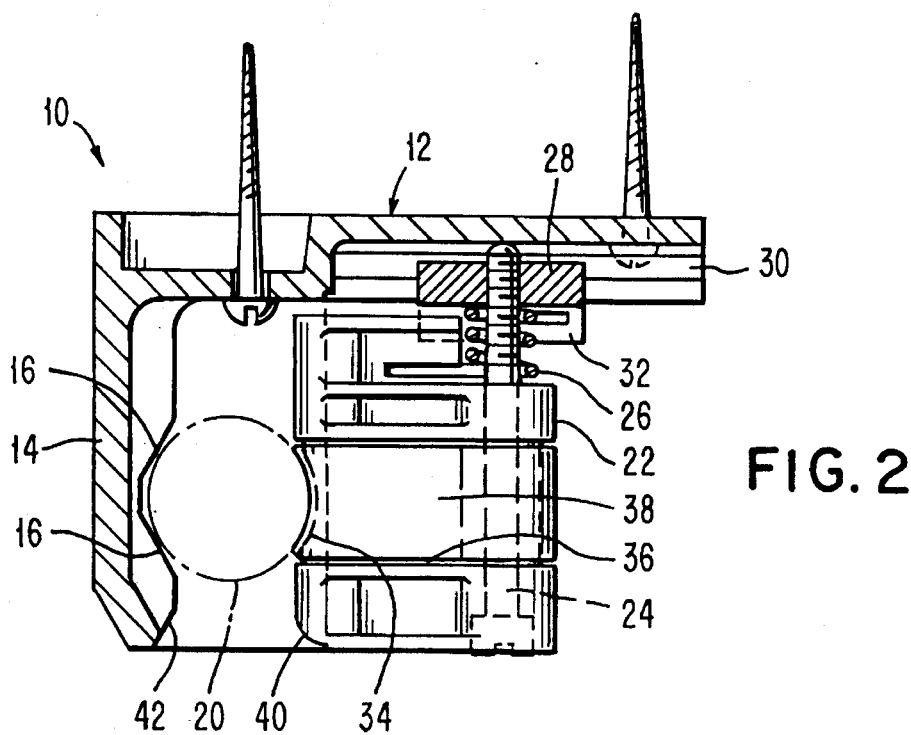
FIG. 2 a horizontal sectional view along the line 2—2 of FIG. 1.

FIGS. 1–3 show the basic design of the holding means 10 with plate-shaped carrier 12 joined at one end at right-angles to a resting jaw 14. On the inside the resting jaw 14 bears horizontal ribs which together, viewed vertically, feature aligned trapezoidal recesses to form clamping faces 16. These clamping faces 16 form a prismatic channel which vertically positions the tube 20 being clamped.

The resting jaw 14 cooperates with a clamping jaw 22 which features at the front a concave clamping face 34 and at the rear a single-piece bearing shell 44 (FIG. 7) with a bearing hole for a bearing pin 24 in the form of a threaded head screw about which the clamping jaw 22 is capable of being swivelled. The screw 24 passes through a spiral spring 26 and is screwed through a slide 28 which is longitudinally displaceable in a longitudinal guide 30 on the carrier 12. In the desired sliding position, the end of the screw presses against the floor of the slide guide 30 and locks the slide. An end of the spiral spring 26 rests against a floor projection 32 of the slide. The other end of the spring rests in a pocket of the clamping jaw which in its position of rest is supported by the projection 32.

Figure 7:
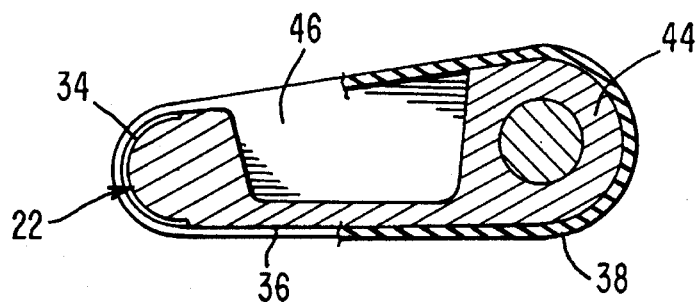

The clamping face 34 of the clamping jaw 22 is approximately semicircular in longitudinal section in accordance with FIG. 1 and, viewed in cross section in accordance with FIG. 2, features in its middle part a concave recess which is longitudinally aligned with the trapezoidal recesses of the ribs on the resting jaw 14. The clamping jaw 22 has a channel 36 on its circumference which extends around the clamping face 34 and the bearing shell 44 and the intermediate surfaces. On the top, the bearing channel 36 opens into an upper recess 46 (FIG. 7). The bearing channel 36 is slightly less deep at the clamping face 34 than elsewhere. This channel receives a pretensioned rubber belt ring 38 which is approximately 2–3 cm wide and 1.5 mm thick. The funnel-like rounded and/or angled edges 40, 42 of the jaws 14, 22 facilitate the introduction of the tube 20 into the clamping gap. The tube 20 centers itself automatically and, after release, the rubber belt ring 38 becomes deformed under the influence of the clamping force. This deformation includes an elongation of the ring's circumference at the clamping face 34 and a concave deformation of the ring in accordance with the tube's circumference. As a result of this elongation, the rubber becomes thicker beneath the clamping zone. As a result of the deformation of the rubber belt ring, subsequent slippage of the tube 20 is prevented even if it features a particularly smooth surface.

Figure 4:
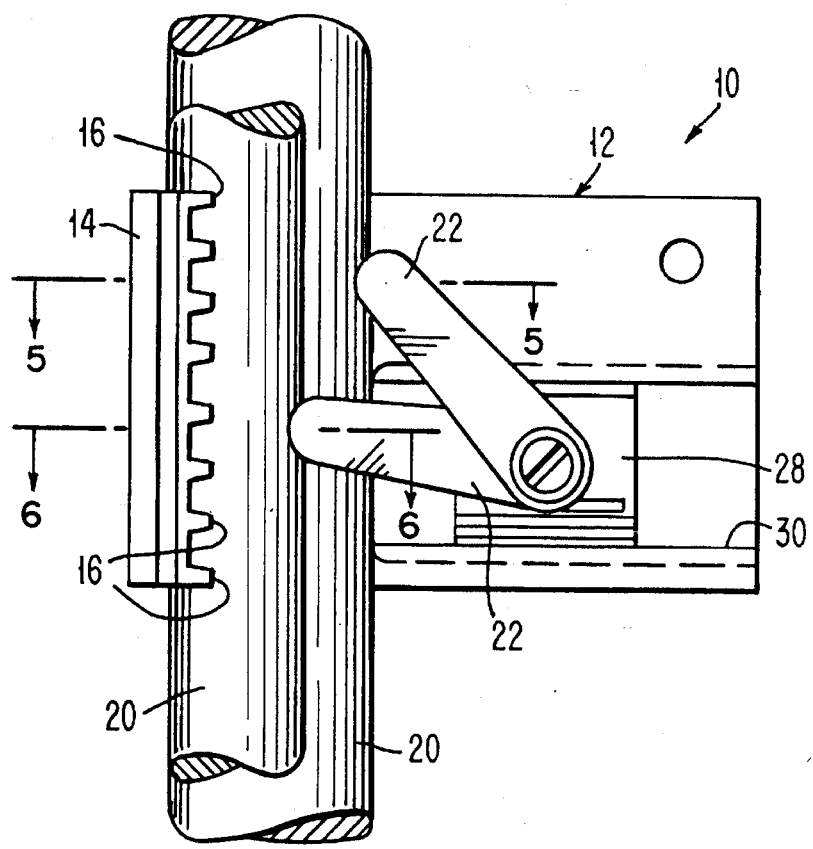
Figure 5:
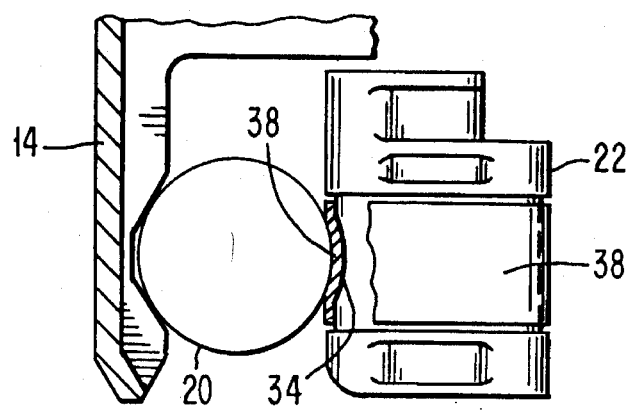
Figure 6:
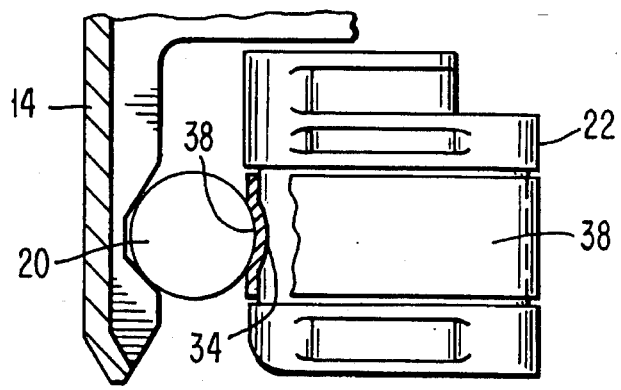

FIGS. 4–6 show the position of the clamping jaw 22 with tubes 20 of different thicknesses.

Figure 8:
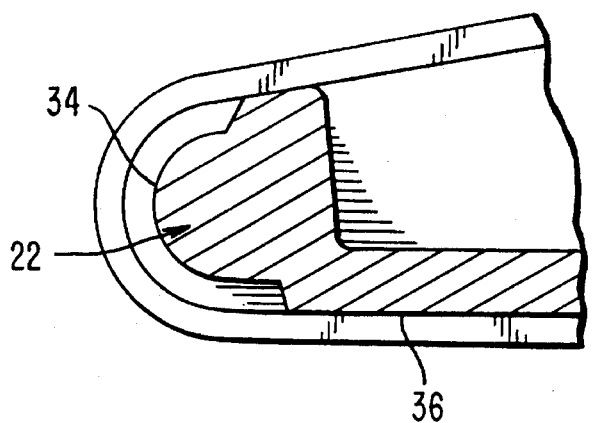
Figure 9:
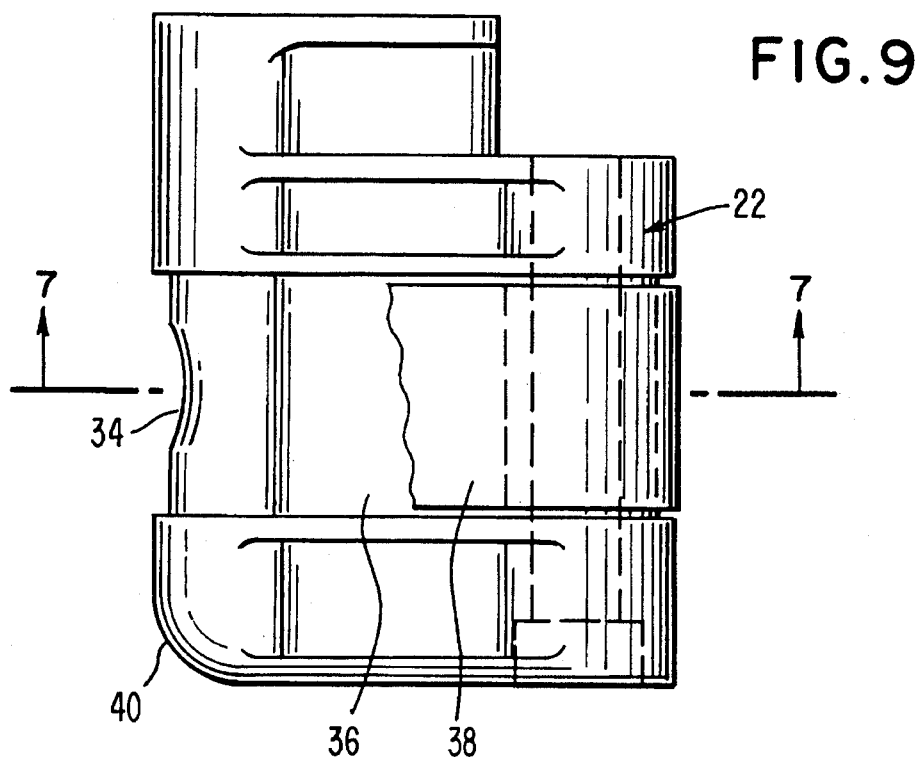

As can be seen from FIGS. 7–9, the channel 36 occupies approximately the middle third of the clamping jaw's 22 width. At the clamping face, the edges of the rubber belt ring 38 rest on the floor of the channel 36 and together with the concave recess in the center of the clamping face 34 form a crescent-shaped cavity. As a result of the pretension of the rubber belt ring 38, the latter penetrates slightly into the cavity. In its clamped state, the tube displaces the rubber belt ring 38 further into this recess. The thereby effected lateral deformation of the rubber belt ring and the already mentioned elongation with the compression of rubber beneath the clamping zone yield extremely good holding properties.

Figure 10:
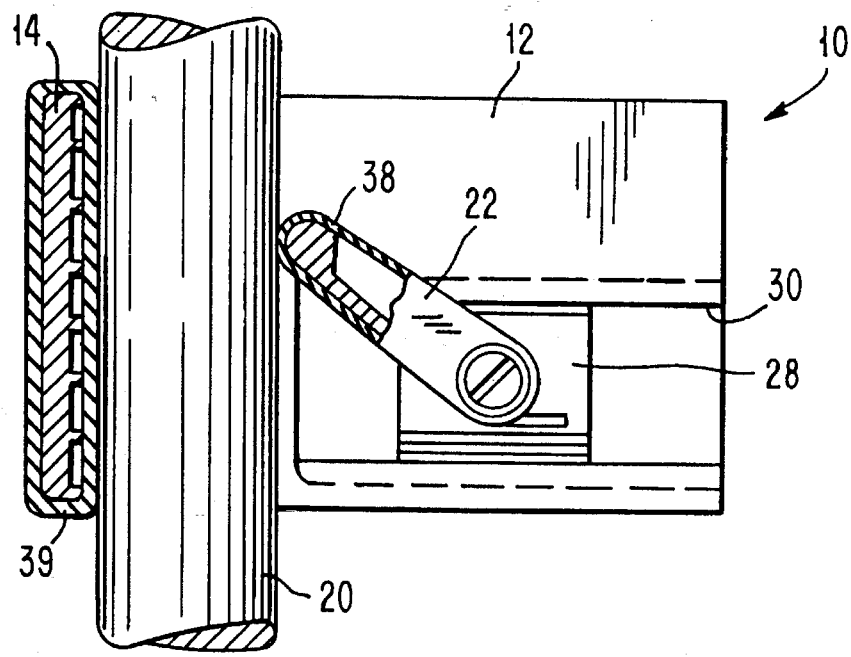
Figure 11:
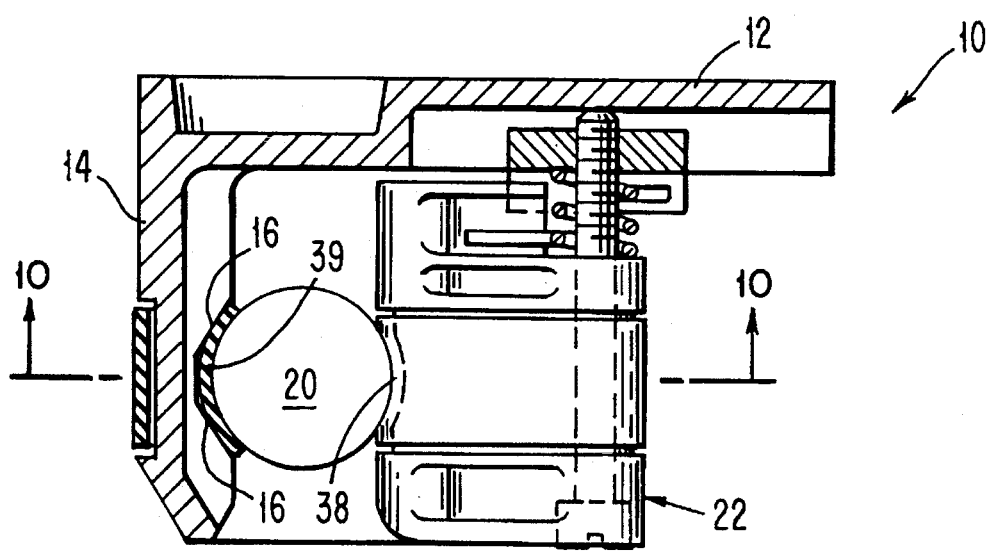

In FIGS. 10 and 11, a suitable rubber belt ring 39 is wrapped around the resting jaw 14 in addition to the rubber belt ring 38 on the movable clamping jaw 22. For most cases, this additional rubber belt ring 39 is unnecessary. However, it has in principle the same advantages as the rubber belt ring 38 with the result that, in a simple embodiment, it can also be employed instead of the rubber belt ring 38 on the movable clamping jaw 22. However, experience has shown that the holding properties of the rubber belt ring on the movable clamping jaw 22 are superior.

I claim:

1. Holding means for shafts and tubes of implements comprising: a plate-shaped carrier to be fastened to a building wall and having a plane; a resting jaw with at least one vertical resting face in a working position projecting from said carrier; a spring-loaded clamping jaw capable of being swivelled about a swivelling axis at right-angles to the plane of the plate-shaped carrier, said clamping jaw having a clamping face facing the resting jaw, a distance of said clamping face from the swivelling axis being greater than a distance of a shaft or tube resting against the resting jaw from the swivelling axis with the consequence that, when the holding means is in its working position, the clamping face of the clamping jaw is at a height above a height of the swivelling axis and the difference in height between said clamping face and the swivelling axis is smaller than the height of the resting face; a rubber belt ring wrapped around the entire clamping jaw under a pretension and active as an anti-slip device; the carrier defining a guide rail comprising a longitudinal guide slot; a slide piece displaceably guided within the guide slot, the slide piece having a thread hole, the clamping jaw having a bearing hole at an end thereof which is opposite the clamping face thereof; a spiral spring arranged between the slide piece and the clamping jaw, one end of the spiral spring resting against a floor projection of the slide piece and the other end of the spiral spring resting against a supporting face of the clamping jaw; and a bearing pin defining said swivelling axis and passing through the bearing hole of the clamping jaw and through the spiral spring and screwed with a threaded end of the pin through said slide piece, whereby an end face of the bearing pin pressing against a bottom face of the guide slot thereby firmly clamping the bearing pin itself and the slide piece at the guide rail and at the same time mounting the clamping jaw for swivelling movement.

* * * * *